US 6,485,023 B2
(12) United States Patent
Budrow et al.

(10) Patent No.: US 6,485,023 B2
(45) Date of Patent: *Nov. 26, 2002

(54) SPLIT MECHANICAL FACE SEAL

(75) Inventors: James Budrow, Oshtemo Township;
Kenneth L. Harris, Ross Township, both of MI (US)

(73) Assignee: Flowserve Management Company, Irving, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/564,816

(22) Filed: May 4, 2000

(65) Prior Publication Data

US 2002/0101038 A1 Aug. 1, 2002

(51) Int. Cl.[7] .................................. F16J 15/34
(52) U.S. Cl. ....................... 277/370; 277/390
(58) Field of Search .............. 277/348, 370, 277/390, 398

(56) References Cited

U.S. PATENT DOCUMENTS

| | | | |
|---|---|---|---|
| 3,188,096 A | | 6/1965 | Wilkinson |
| 4,410,188 A | | 10/1983 | Copes |
| 4,509,762 A | * | 4/1985 | Garrett .................... 277/398 |
| 4,533,149 A | | 8/1985 | Vater et al. |
| 4,580,788 A | | 4/1986 | Rabe et al. |
| 4,580,793 A | | 4/1986 | Bronson |
| 4,858,936 A | | 8/1989 | Adams |
| 4,989,882 A | * | 2/1991 | Warner et al. ............ 277/370 |

(List continued on next page.)

FOREIGN PATENT DOCUMENTS

GB    2 281 763 A    3/1995

OTHER PUBLICATIONS

Durametallic Corporation Drawing No. 2D-255051-R8, May 10, 1990 (2 sheets).
Durametallic Corporation Brochure, "The PSS Dura Seal", 1990 (4 pages).
A.W. Chesterton Company Brochure, "221 Split Seal", Nov. 1989 (4 pages).
Crane Packing Company, "Installation Instructions for Type 26 Split Seal", 1964 (4 pages).
Flex–A–Seal, Inc., Style 85 Installation Instructions and drawing (5 pages).

Primary Examiner—Robert J. Sandy
Assistant Examiner—Karlena D. Schwing
(74) Attorney, Agent, or Firm—Flynn, Thiel, Boutell & Tanis, P.C.

(57) ABSTRACT

A split mechanical face seal assembly wherein stator and rotor face rings and their respective surrounding collar and gland are all split substantially diametrically and are partially factory preassembled to facilitate shipping, handling and subsequent assembly onto a machine at the job site. The split rotor face ring and the split supportive collar have the cooperating parts thereof subassembled into two subassemblies which define opposed halves for permitting them to be assembled on diametrically opposite sides of a shaft, with each subassembly having the rotor face ring segment carried on the support collar segment, and an elastomeric seal ring which cooperates between the segments being preassembled therebetween. The stator face ring and its supporting gland ring also have the respective split segments thereof, and the other cooperating components such as seal rings and the like, preassembled at the factory to define a pair of subassemblies.

24 Claims, 7 Drawing Sheets

U.S. PATENT DOCUMENTS

| | | |
|---|---|---|
| 5,020,809 A | 6/1991 | Mullaney |
| 5,067,733 A | 11/1991 | Nagai et al. |
| 5,114,163 A | 5/1992 | Radosav et al. |
| 4,576,384 A | 6/1992 | Azibert |
| 5,199,720 A | 4/1993 | Radosav et al. |
| 5,354,070 A | 10/1994 | Carmody |
| 5,403,020 A | 4/1995 | McOnie |
| 5,490,682 A | 2/1996 | Radosav et al. |
| 5,571,268 A | 11/1996 | Azibert |
| 5,662,340 A | 9/1997 | Bessette et al. |
| 5,711,531 A | 1/1998 | Clark et al. |
| 5,716,054 A | 2/1998 | Duffee et al. |
| 5,725,220 A | 3/1998 | Clark et al. |
| 5,820,129 A | 10/1998 | Reagan |
| 5,823,539 A | 10/1998 | Rockwood |
| 5,913,520 A | 6/1999 | Clark et al. |
| 5,913,521 A | 6/1999 | Sangren et al. |
| 6,059,293 A | 5/2000 | Azibert et al. |
| 6,068,263 A | 5/2000 | Azibert et al. |
| 6,068,264 A | 5/2000 | Azibert et al. |
| 6,076,832 A | 6/2000 | Pow |
| 6,131,912 A | 10/2000 | Azibert et al. |
| 6,131,913 A * | 10/2000 | Auber et al. ............ 277/390 X |

* cited by examiner

SPLIT MECHANICAL FACE SEAL

FIELD OF THE INVENTION

This invention relates to a mechanical seal assembly for pumps and the like and more particularly to an improved split mechanical face seal assembly.

BACKGROUND OF THE INVENTION

Mechanical face seal assemblies are used on a wide variety of machines including pumps and the like having rotating shafts that pass through housings, with the mechanical seal assembly typically being disposed in surrounding relationship to the shaft and cooperating with a stuffing box of the housing to create a sealed relationship between the shaft and housing. Since installation or replacement of mechanical seal assemblies employing one-piece ring members is an extremely time consuming and complex operation, numerous split seal assemblies have been developed to facilitate installation and repair.

The split face seal assemblies are typically split generally diametrically along the axis of the assembly so that the face rings as well as the support rings therefore are all diametrically split so that the various seal assembly components can be mounted on or removed relative to the shaft without requiring excessive disassembly of the overall machine. While split mechanical seal assemblies hence are recognized to possess highly desirable advantages, nevertheless the construction of split seal assemblies continues to present a significant problem with respect to manufacture, assembly and performance thereof.

As to known split mechanical face seal assemblies, most such assemblies have both the stator and rotor face rings split diametrically, and also employ a support collar and a gland member which respectively cooperate with the rotor and stator face rings and which are also diametrically split. All other associated members such as elastomeric seal rings and the like are also split to permit their positioning around the shaft. This construction and the multiple parts thereof hence creates a significant assembly problem since the numerous parts must be field assembled onto the machine (for example a pump), and the parts must cooperate with the precision and fit necessary so as to provide the desired sealing performance. In particular, the split rotor and stator face rings and the respective supporting collar and gland results in a total of eight separate pieces, not counting separate split seals and the like, such that manipulating and assembling this large number of parts at an on-site location and at the same time obtaining or maintaining proper fit and engagement between the parts is thus a relatively complex and time consuming operation. Further, many of the split seals currently commercially available have been unable to provide a consistent performance level since presence of unacceptable leakage levels in such seals has been a fairly common problem.

In addition, because of the difficulties in obtaining proper flatness and opposed flat engagement between the opposed contacting seal faces defined on the diametrically-split rotor and stator face rings, some known constructions have supported these rings and specifically the rotor on resilient support rings in an attempt to compensate for irregularities and distortion. Further, in some of the known constructions the pressure of the working fluid (i.e., the pump fluid) which exists in the stuffing box in surrounding relationship to the seal assembly acts against and urges the rotor face ring more tightly against its supporting collar, and this tends to further increase distortion and the resulting overall performance problems associated with the seal assembly.

Accordingly, it is an object of this invention to provide an improved split mechanical face seal assembly which improves on and overcomes many of the disadvantages which are present in many of the current commercially available split mechanical seals.

More specifically, the present invention relates to an improved split mechanical face seal assembly wherein the stator and rotor face rings and their respective surrounding collar and gland are all split substantially diametrically and are partially factory preassembled to define a reduced number of preassembled subassemblies so as to facilitate shipping, handling and subsequent assembly onto a machine at the job site.

In a preferred embodiment of the invention, the split rotor face ring and the split supportive collar have the cooperating parts thereof subassembled into two subassemblies which define opposed halves for permitting them to be assembled on diametrically opposite sides of a shaft, with each subassembly having the rotor face ring segment carried on the support collar segment, and an elastomeric seal ring which cooperates between the segments being preassembled therebetween. The stator face ring and its supporting gland ring also have the respective split segments thereof, and the other cooperating components such as seal rings and the like, preassembled at the factory to define a pair of subassemblies.

In the improved split mechanical seal assembly of this invention, particularly a preferred embodiment thereof, the split rotor has a rear surface thereof directly and substantially rigidly seated against an opposed surface defined on the split collar, and the rotor and stator face rings have diametrical relationships such that, when externally acted on by the pressurized pump or working fluid, the pressurized fluid exerts an unbalanced force against the rotor which acts in a direction away from the seating surface to thus minimize and in fact possibly reduce the spring-induced seating contact pressure between the rotor face ring and the collar.

Other objects and purposes of the present invention will be apparent to persons familiar with seal assemblies of this general type upon reading the following specification and inspecting the accompanying drawings.

Figure 1:
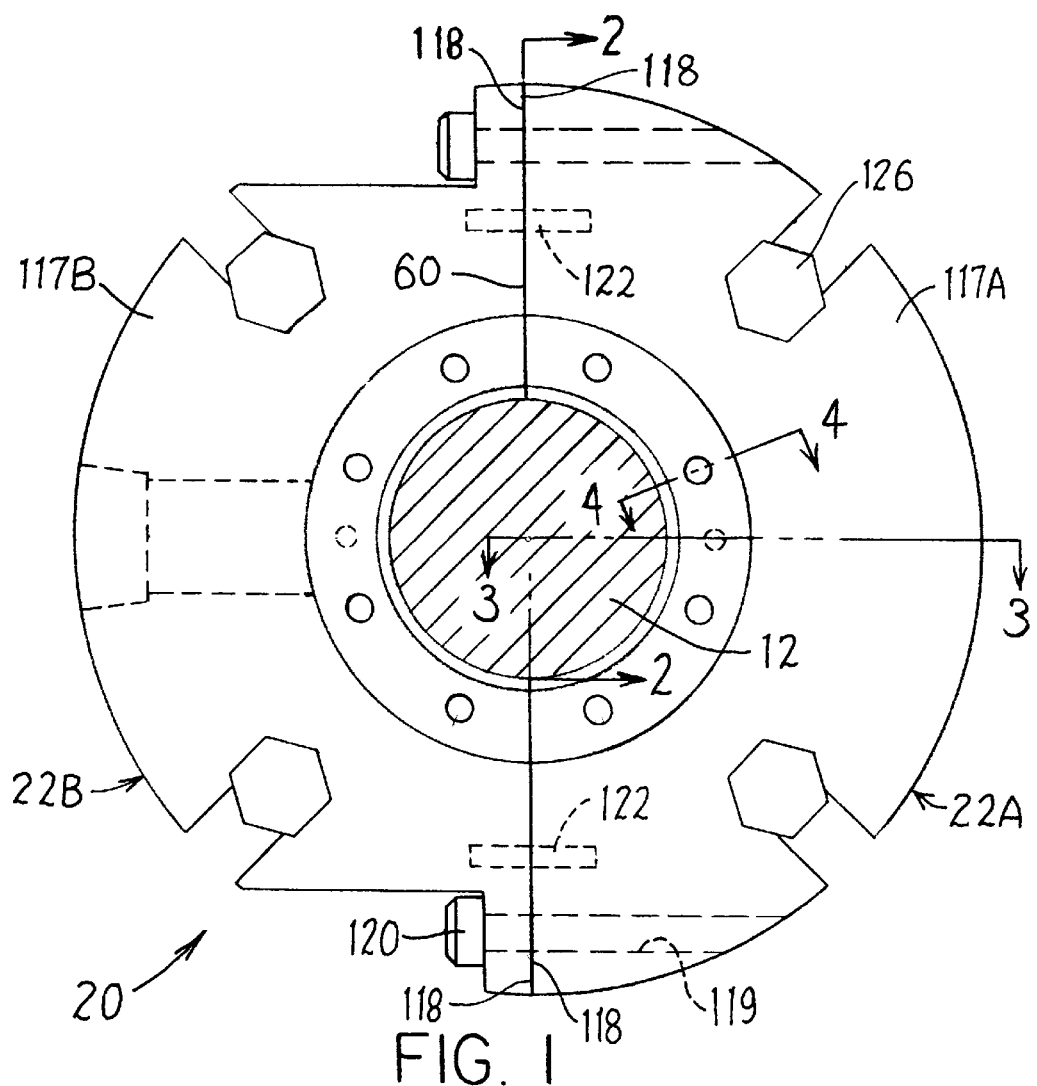
FIG. 1 is an end elevational view of a split mechanical face seal assembly according to the present invention.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the seal assembly and designated parts thereof. Said terminology will include the words specifically mentioned, derivatives thereof, and words of similar import.

DETAILED DESCRIPTION

Figure 2:
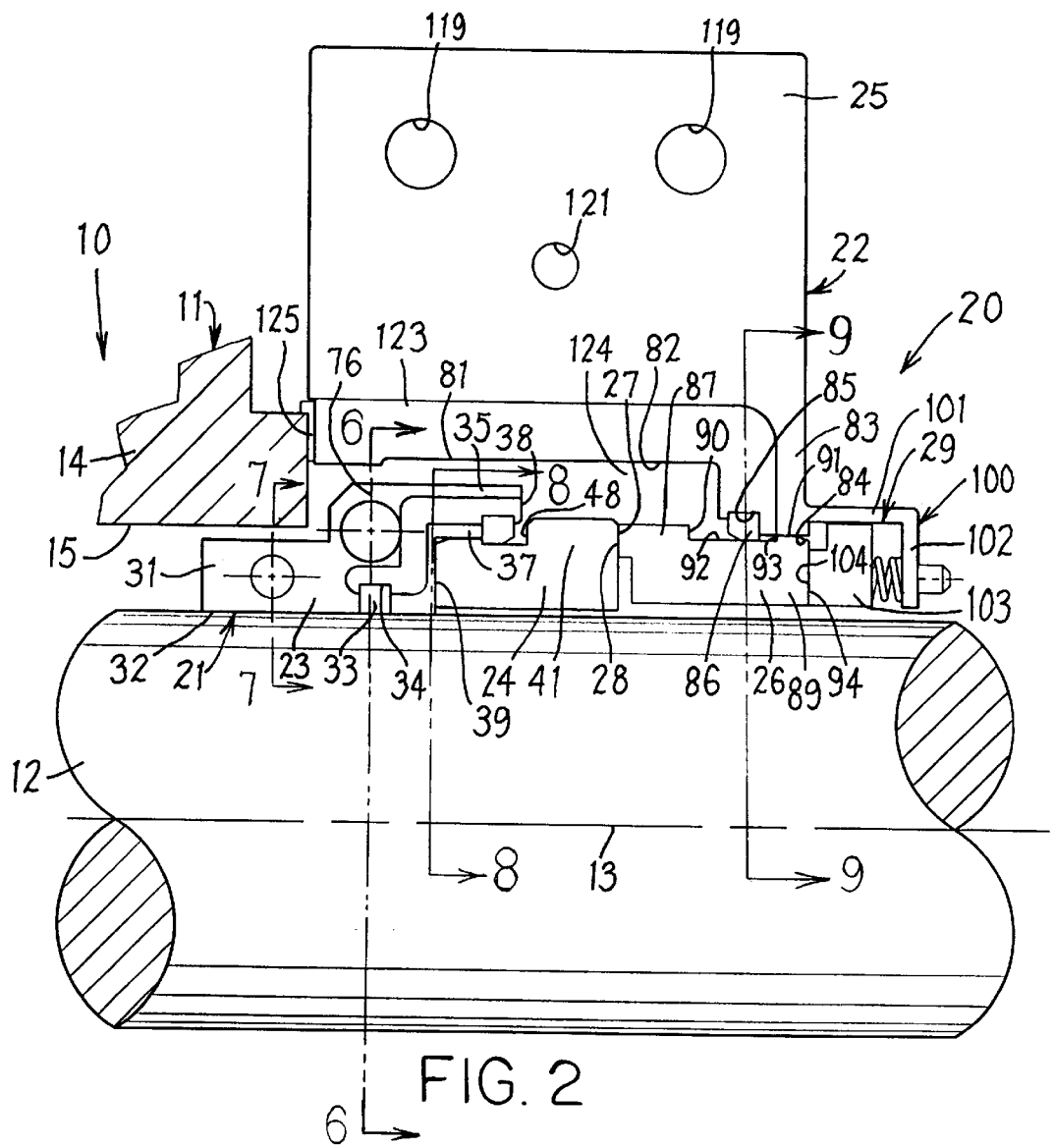
FIG. 2 is an enlarged fragmentary sectional view taken generally along line 2—2 in FIG. 1.
Figure 3:
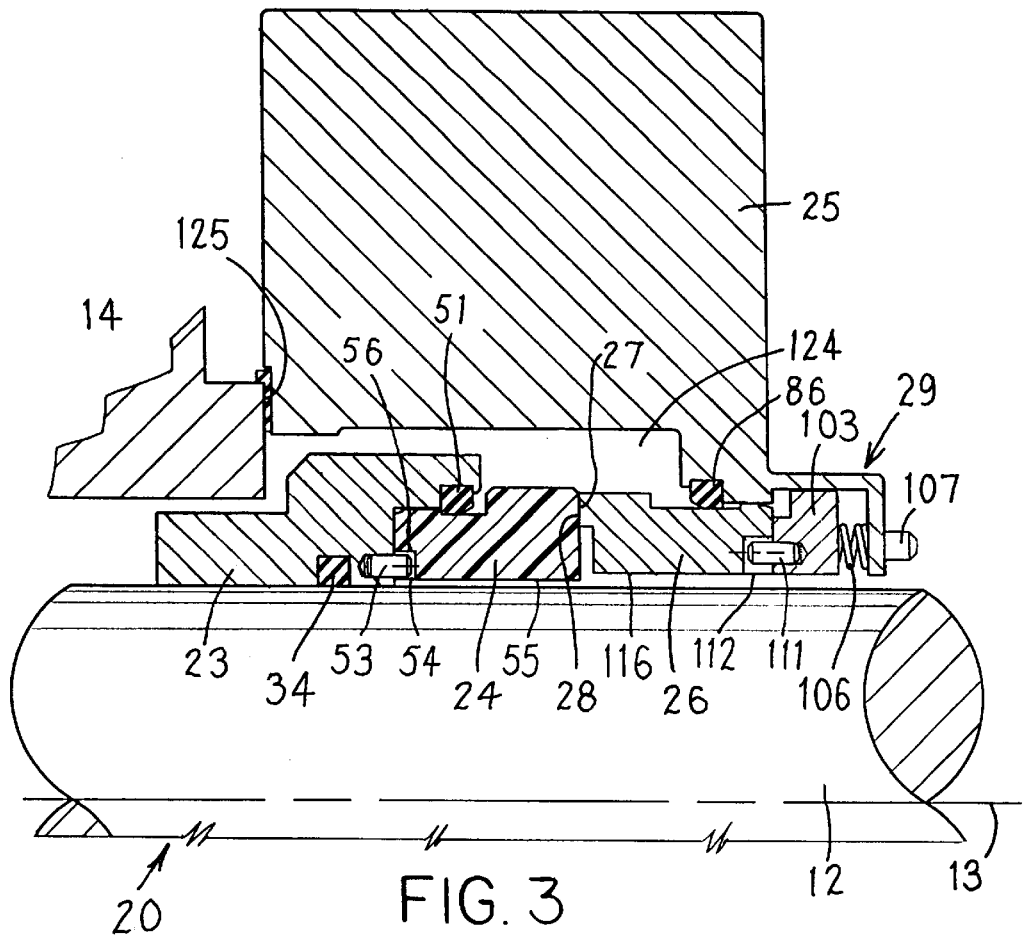
FIG. 3 is an enlarged fragmentary sectional view taken generally along line 3—3 in FIG. 1.
Figure 4:
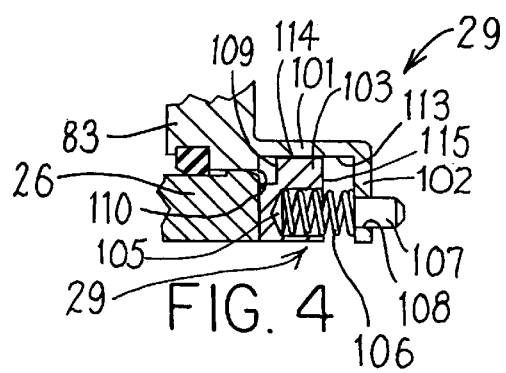
FIG. 4 is an enlarged fragmentary sectional view taken along line 4—4 in FIG. 1.
Figure 5:
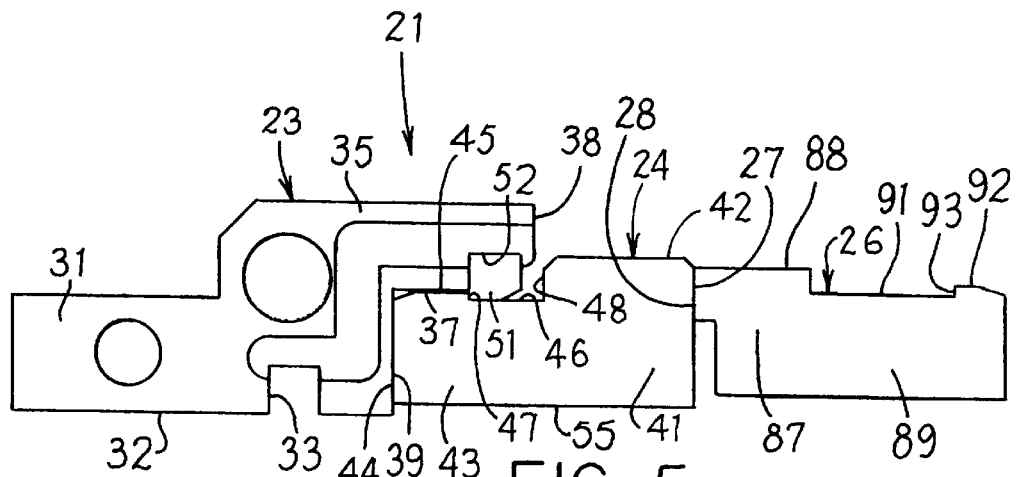
FIG. 5 is an enlarged fragmentary view of the opposed face rings as shown in FIG. 2.

Referring FIGS. 1–3 there is illustrated parts of a fluid handling device 10, such as a pump, having a housing 11 defining therein a fluid chamber (not shown) and provided with a shaft 12 which rotates about its axis 13, which shaft in a typical pump has a pumping impeller (not shown) secured thereto. The shaft 12 projects outwardly through a sleeve like housing part 14 which defines therein an annular chamber 15, commonly referred to as a stuffing box.

To create a sealed relationship where the shaft 12 projects outwardly from the stuffing box 14, a mechanical face seal assembly 20 is disposed in surrounding relationship to the shaft and cooperates with the stuffing box 14 to effectively seal the interior of the fluid handling device and prevent the pump or process fluid from escaping to the surrounding environment.

The improved mechanical face seal assembly 20 of the present invention is of an axially split construction, described hereinafter, to facilitate mounting or demounting of the assembly relative to the shaft. The seal assembly includes a rotor assembly 21 which surrounds the shaft and is nonrotatably coupled thereto. The rotor assembly in turn cooperates with a stator assembly 22 which also substantially concentrically surrounds the shaft but is mounted on and hence is nonrotatably carried by the housing 11. The rotor and stator assemblies 21 and 22 cooperate to define a face seal which effectively seals the outer end of the stuffing box 14.

In the seal assembly 20 of this invention, the rotor assembly 21 includes a sleevelike collar 23 which concentrically surrounds and is nonrotatably and sealingly secured to the shaft 12, and this collar in turn concentrically mounts thereon a seal or face ring 24, often referred to as the rotor. The stator assembly 22 includes a sleevelike support member 25, commonly referred to as the gland, the later being disposed in surrounding relationship to the shaft and being fixably secured to the housing 11. The gland 25 in turn mounts thereon a seal or face ring 26, commonly referred to as a stator. The face rings 24 and 26 are disposed in substantially concentric and surrounding relationship to the shaft and are positioned axially adjacent in opposed relationship, and defined flat annular seal faces 27 and 28 thereon which are positioned substantially within planes which extend in perpendicular relationship with respect to the axes of the respective rings. The stator assembly 22 also has a spring unit 29 associated therewith and coating with the outer end of the face ring 26 so as to urge the later axially toward the face ring 24, whereby the opposed seal faces 27 and 28 are maintained in abutting and relatively rotatable sliding contact with one another to define an annular contact seal between regions disposed adjacent the radially inner and outer peripheral edges of this annular contact seal.

The overall constructional and operational features of the mechanical seal assembly 20 of the present invention, as briefly summarized above, are conventional and well known.

Considering now the construction of the seal assembly 20 in greater detail, and referring initially to the rotor assembly 21, the sleevelike collar 22 includes a rear annular sleeve part 31 having an inner annular peripheral wall 32 which is sized to closely fit the outer diameter of the shaft 12. This inner wall 32 has an annular groove 33 undercut therein and the latter accommodates therein an annular elastomeric seal ring 34 for creating a sealed engagement with the periphery of the shaft 12. The collar 23 also has a front sleeve part 35 which is integral with the rear sleeve part 31 and which defines therein an enlarged annular bore or chamber 37 which opens axially inwardly from the front end face 38 of the collar. The inner annular wall 37 of the bore projects axially inwardly only over a portion of the overall length of the collar so as to terminate at an annular flat rear or bottom wall 39 which extends radially inwardly for intersection with the inner annular wall 33 and is disposed within a plane which substantially particularly intersects the longitudinal axis of the collar.

The face ring 24 is typically constructed of silicon carbide or ceramics and is sealingly and nonrotatably carried on the collar 23, and includes a nose part 41 defined by an outer peripheral annular wall 42, with nose part 41 terminating in a generally radially projecting rear wall 48 which is typically spaced forwardly from the collar end wall 38. The face ring 24 also has an annular rear part 43 which is integral with and projects rearwardly from the nose part 41, and which terminates in a flat annular rear wall 44 disposed in a plane which perpendicularly intersects the axis of the face ring and is maintained in seating contact with the opposed collar wall 39. The rear sleeve part 43 of the face ring 24 has a rear annular outer peripheral wall 45 which projects axially forwardly from the rear wall 44 through a fraction, approximately one-half in the illustrating embodiment, of the distance towards the rear wall 48 of the nose part. The rear sleeve part 43 also has, disposed axially between the nose part 41 and the rear peripheral wall 45, an intermediate outer annular peripheral wall 46 which is of slightly smaller diameter than the rear peripheral wall 45, with the two walls being joined by an annular shoulder 47 which projects radially between the walls 46 and, and which faces axially forwardly toward the rear wall 48.

As illustrated in FIGS. 2 and 3, the rear sleeve part 43 of face ring 24 is substantially concentrically disposed within the front sleeve part 35 of collar 23 and the later mounts thereon an annular elastomeric seal ring 51 which is secured within an undercut groove 52 which opens radially outwardly from the inner annular wall 37. The groove 52 and the seal ring 51 carried therein is positioned closely adjacent the free end of the collar sleeve part 35. In addition, the elastomeric seal ring 51 projects radially inwardly to create an annular sealed engagement with the exterior of the face ring 24, with the disposition of the seal ring being such that it engages the intermediate outer peripheral wall 46 just forwardly or outwardly of the shoulder or step 47 when the face ring is seated against the rear collar wall 39, whereby the seal ring 51 cooperates with the shoulder or step 47 to thus axially retain the face ring 24 in a position wherein it is seated within the collar 23, substantially as illustrated by FIGS. 2 and 3.

To further assist in connecting and nonrotatably coupling the collar 23 and face ring 24 together, the collar 23 has at least two drive pins 53 (FIGS. 3 and 6) secured thereto, for example by being press fit into bores which projects axially inwardly from the rear surface 39 in close proximity to the inner diameter 32. The drive pin 53 projects axially outwardly beyond the rear surface 39 and is adapted to project into a small notch or groove 54 formed adjacent the rear inner corner of the rear sleeve part 43 of face ring 24. The notch 54 opens radially outwardly from the inner annular cylindrical wall 55 of the face ring 24, the diameter of which is normally slightly greater than the diameter of the wall 32 of the collar. The notch 54 projects radially from the inner wall 55 through a small distance so as to terminate at a radially outer wall 56 which is normally positioned closely adjacent the outer side of pin 53 when the mechanical seal assembly is mounted on the shaft. The circumferential width of the notch 54 also closely conforms to and only slightly exceeds the diameter of pin 53 so that the pin 53 acts as a driving pin for nonrotatably coupling the collar 23 and face ring 24 together.

The rotor assembly 21 according to the present invention is diametrically split generally along the plane 60 (FIGS. 1 and 6) into two substantially identical and substantially semicircular subassemblies which are designated 21A and 21B. In this respect, the diametrical split results in the sleevelike collar 23 being split into substantially semi-cylindrical collar segments 61A and 61B the rotor or face ring 24 being split into two substantially identical and semicircular rotor segments 62A and 62B, and the elastomeric seal ring 51 also being split into two substantially identical semi-cylindrical seal ring segments.

Each of the rotor subassemblies 21A and 21B can be initially factory preassembled to facilitate shipping, handling and subsequent assembly at the job site. Considering the rotor subassembly 21A as an example, the rotor segment 62A is axially inserted into the respective collar segment 61A in such fashion that the rotor affects compression of the respective segment of the elastic seal ring 51 carried by the collar segment 61A. The rotor segment 62B is axially inserted into the collar segment until the opposed walls 39 and 44 abut, in which position the elastic seal ring segment 51 expands to engage the annular wall 46 directly forwardly of the step or shoulder 47 to axially hold the seal ring segment 51 within the collar. At the same time, during insertion of the face ring segment 62A into the collar segment 61A, the drive pin 53 of the collar segment projects into the notch 54 which, due to the close positional relationship between the pin 53 and the adjacent radially outer wall 56 of the notch 54, causes the pin 53 to effectively engage the outer notch wall 56 due to the resilient urging of the elastic seal ring 51. The drive pin 53 cooperating with the radially outer wall of the notch, and the seal ring 52 cooperating with the shoulder 47, thus function to securely retain the collar and face ring segments 61A, 62A together to create a preassembled or unitized rotor subassembly 21A. Both rotor subassemblies 21A and 21B are preassembled in this matter.

To optimize the above relationship, the drive pin 53 and its cooperating notch 54 are disposed generally within a plane 61 which perpendicularly intersects the splitting plane 60 generally at the longitudinal central axis 31 of the rotor assembly so that the pin and notch are thus midway between the ends of the semicircular segments. While this disposition is preferred so as to optimize the use of a single drive pin per segment, it will be appreciated that each segment can be provided with two or more drive pins, and as such the location thereof can thus be varied.

To permit fixed securement of the rotor subassemblies segments 21A and 21B to the shaft 12 in surrounding relationship therewith, the opposite ends of the collar segments 61A and 61B are provided with openings 65 which extend perpendicularly from the flat end surfaces 66 of the collar segments, which end surfaces are defined generally by the splitting plane 60, with the openings 65 in the ends of the rotor segments being aligned when the opposed end surfaces 66 abut. An alignment pin 64 is fixed, as by a press fit within the opening 65 of one of the collar segments and projects outwardly therefrom for snug slidable engagement into the opposed opening 65 of the other collar segment. Such alignment pin 64 is provided at each end of one of the collar segments so that the pair of alignment pins hence slideably engage the openings in the other collar segment to permit the two collar segments to be properly aligned on opposite sides of the shaft, and then moved into full engagement with one another in concentric relationship to the shaft.

To thereafter secure the rotor subassemblies 21A and 21B together, the collar segment 61B has a smooth bore 67 which projects perpendicularly away from the flat end surface 66 at each end of the collar segment and the other collar segment 61A has a threaded bore 68 which opens away from the end surface 66 at each end of the collar segment. The threaded bores 68 respectively align with the nonthreaded bores 67, and a pair of threaded fasteners 69, such as cap screws, are inserted through the smooth bores 67 provided at opposite ends of the collar segment 61B and are threaded into the aligned threaded bores 68 provided in opposite ends of the collar segment 61A to thus securely fasten the collar segments together and thereby create a rigid annular structure. The collar segments may be provided with pockets 70 which open inwardly from the outer periphery thereof to facilitate access to the fasteners.

Figure 6:
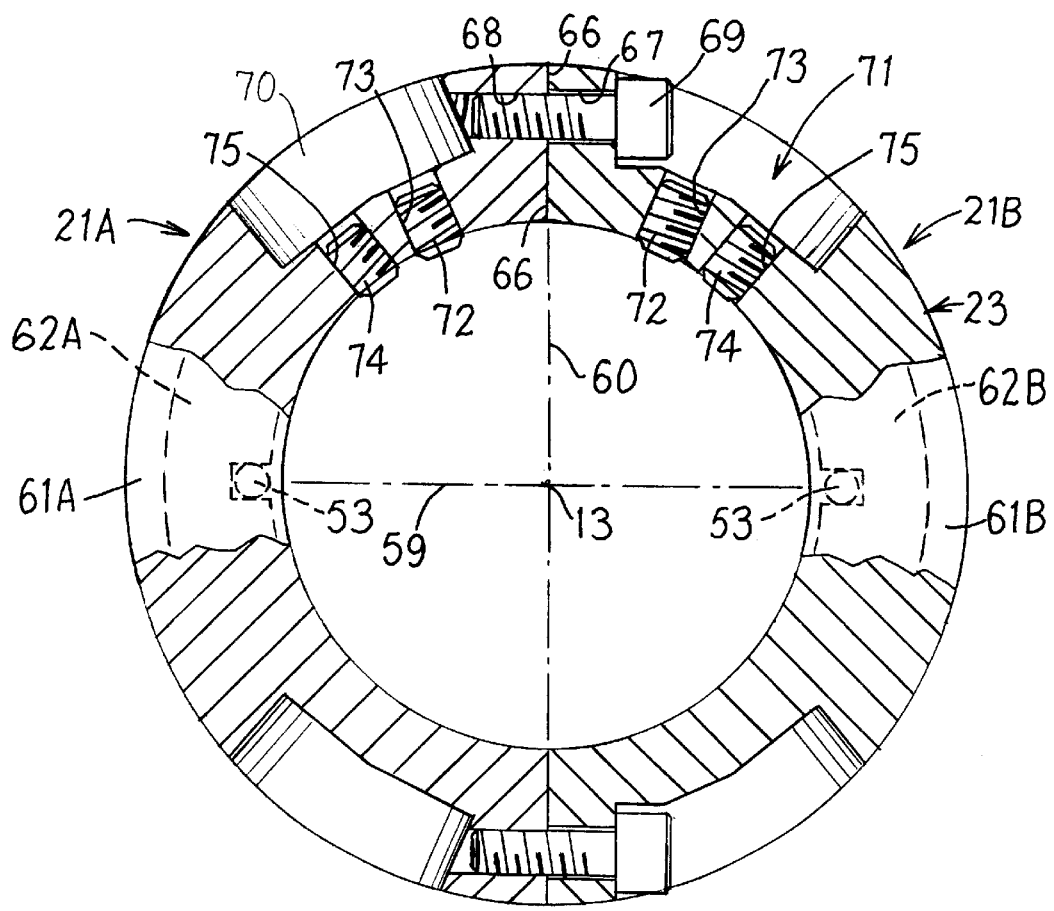
FIG. 6 is an enlarged fragmentary sectional view taken generally along line 6—6 in FIG. 2.
Figure 7:
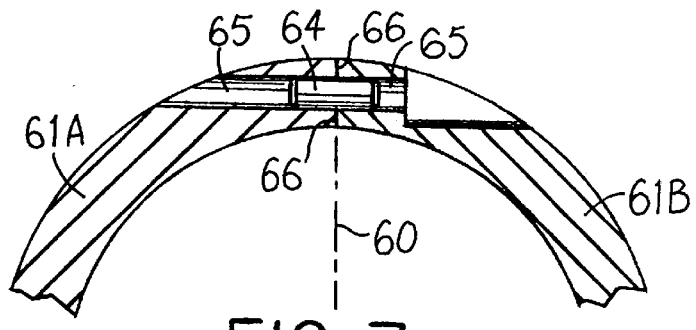
FIG. 7 is an enlarged fragmentary sectional view taken along line 7—7 in FIG. 2.

To in turn permit the rotor assembly 21 as assembled from the rotor subassemblies 21A and 21B to be nonrotatably secured to the shaft 12, the rotor assembly includes a shaft fastening arrangement 71 defined by a pair of threaded set screws 72 which individually cooperate with respective threaded bores 72 formed radially through the collar 23. The bores 72 extend radially so as to substantially intersect the shaft axis 13, and the bores are positioned closely adjacent but on circumferentially opposite sides of one of the cap screws 69 substantially as illustrated in FIG. 6, whereby one said bore 73 is disposed adjacent the end of the collar segment 61A, and the other said bore 73 is disposed adjacent the opposed end of the other collar segment 61B. The pair of bores 73 and their close straddling relationship to the adjacent cap screw 69, and the radial orientation of the bores 73, is highly desirable since this results in the holding force between the set screws and shaft being oriented dominantly in a direction perpendicular to the longitudinal axis of the cap screw, and hence greatly minimizes the forces created from the set screws 72 acting to effect separation of the collar segments.

In the illustrated arrangement, a further pair of set screws 74 are provided within threaded bores 75, the latter also extending radially intersecting relationship to the axis 13. The bores 75 circumferentially straddle the bores 73 and are positioned circumferentially closely adjacent the bores 73 so as to again minimize the set screw holding force which acts to effect separation between the collar segments. The dominate set screw force thus acts generally downwardly so that, as viewed in FIG. 6, the bottom side of the shaft is securely engaged with the bottom peripheral surface of the collar.

The center line of the cap screws 69, as well as the center lines of the set screws 72 and 74, are all preferably disposed within a single transverse plane 76 (as shown in FIG. 6) which extends in perpendicular relationship to the axis 13, and which in the illustrated embodiment is disposed in close proximity to the transverse plane defined by the rear collar wall 39. This relationship and particularly the disposition of the cap screw and set screws within a common plane hence eliminates torsional or moment forces in the axial direction and hence significantly minimizes those moments and forces which tend to tortionally distort the collar and hence interfere with proper seating of the face ring 24 within the collar 23. This minimization of the distortion of the rotor 24 thus minimizes distortion of the seal face 27 and provides improved contact between the opposed flat seal faces 27 and 28.

It is preferred that the shaft fastening arrangement 71, as defined by the set screws 72 and 74, be provided on only one diametrical side of the collar 73, namely only at one opposed ends of the collar segments as illustrated in FIG. 6, with the other opposed ends of the collar segments being cooperatively engaged solely through the alignment pin and the cap screw. Further, while the second set of set screws 74 is desirable for providing redundancy with respect to securement of the collar to the shaft, it will be appreciated that the second set of set screws 74 is not required and can be eliminated if desired.

Considering now the construction of the stator assembly 22, and specifically the construction of the gland 25, it has a stepped bore 81 extending axially there through which is defined by an inner annular peripheral wall 82 which extends through a majority of the axial thickness of the gland member. The gland member, adjacent the outer wall thereof, has an annular wall part 83 which projects radially inwardly from the inner annular wall 82 and terminates at an inner annular wall 84 which extends axially outwardly. The wall 84 has an undercut annular groove 85 form therein, and an annular elastomeric seal ring 86 is captivated in the groove 5 and projects radially inwardly for sealing engagement with the stator 26.

The stator or face ring 26 is typically constructed of silicon carbide or carbon, and at its inner end has an annular nose part 87 defined by an outer annular peripheral wall 88. The nose part on the front and thereof defines the annular seal face 28 which cooperates with the opposed seal face 27 on the rotor 24.

The annular nose part 87 of the stator is integrally joined to a rear or outer sleeve part 89 which projects axially into the bore defined by the inner annular wall 84 on the gland. This rear sleeve part 89 projects axially rearwardly away from the annular rear wall 90 of the nose part and has an intermediate outer annular wall 92 which projects away from the rear nose wall 90 until reaching an annular shoulder 93 which projects radially outwardly and faces toward the rear nose wall 90. This annular shoulder 93 projects radially outwardly through a small extent, and then joins to a rear annular outer wall 91, which then continues to project axially outwardly or rearwardly so as to terminate in a generally transverse annular end wall 94.

The outer annular wall 91 is sized so as to be axially slideably engaged with the inner annular wall 84 of the gland, and the intermediate outer annular wall 92 is sized so as to be slideably but sealingly engaged with the elastomeric seal ring 86 normally in axially spaced relation from the shoulder 93.

The spring unit 29 cooperates with the outer end wall 94 of the stator to normally urge the latter into contact with the rotor. The gland 25 has an annular shroud 100 provided thereon for support and confinement of the spring unit 29. The shroud 100 includes an outer annular wall 101 which projects axially through a selected distance in concentric surrounding relationship to the axis 13, and at its outer end integrally joins to a ring like end wall 102 which projects radially inwardly to a diameter which is greater than the shaft diameter. The spring unit 29 includes a ring-shaped pusher member 103 having a transverse flat annular front or end face 104 which is normally maintained in abutting engagement with the end face 94 of the stator. The pusher member 103 also has a plurality of circumferentially spaced pockets or blind bores 105 formed therein and opening inwardly from the opposite end face 115 thereof. Each of these pockets 105 contains a small biasing member such as a coiled compression spring 106, and the latter projects axially toward and has an end thereof engaged with the inner surface of the shroud end wall 102. Each spring 106 also has a guide pin 107 fixed thereto and projected axially outwardly so as to be slideably engaged within a respective opening 108 formed through the shroud end wall 102. The engagement of the pins 107 within the openings 108, and the confinement of the springs 106 within the pockets 105 hence creates a nonrotatable connection between the gland shroud 100 and the pusher member 103.

The outer annular wall 114 of the pusher ring is sized so as to be axially slideably engaged with the inner annular wall 113 of the surrounding shroud wall 101. In addition, the pusher 103 has an annular face 109 formed adjacent the outer diameter thereof and facing axially inwardly in opposed relationship to an annular stop surface 110 defined on the gland wall 83 adjacent the inner annular wall 84 so as to limit the inward spring-urged position of the pusher member 103.

The pusher number 103 also has a pair of pins 111 secured thereto, preferably at diametrically opposed positions, which pins project axially outwardly from the front face of the pusher and project axially into opposed small grooves or notches 112 formed in the adjacent opposed end of the stator. The notches 112 open radially outwardly from the inner annular wall 116 of the stator, which wall 116 is sized so as to be somewhat greater than the shaft diameter. The size and position of the notch 112 and its cooperation with the pin 111 is substantially identical to the same size and positional relationships associated with the pin 53 and notch 54 associated with the rotor assembly, so that further description of the pin 111 and notch 112 is believed unnecessary.

The stator assembly 22 is also axially split along the diametrical plane 60 in the same manner as the rotor assembly, as described above. More specifically, the diametral and axial splitting of the stator assembly results in two substantially identical and substantially semi cylindrical gland segments 117 which each have, at opposite ends thereof, flat end surfaces 118 which substantially abuttingly engage the opposed end surface of the other gland segment when the two gland segments are coupled together.

The stator ring 26, the elastomeric seal ring 86 and the pusher ring 103 are also diametrically split into substantially identical semicircular segments so as to cooperatively mount on and permit preassembly with respect to the respective semicircular gland member segments. In this regard, the split pusher ring segment is slideably retained in the respective gland segment due to the engagement of the spring glide pins 107 within the shroud openings 108 and the engagement of the pin 111 within the notch 112, whereby pin 111 radially retains the stator segment in engagement within the gland segment and specifically in at least partially compressed engagement with the segment of the elastomeric seal ring. The segment of the pusher ring is also axially restrained due to the stop face 109 abutting the stop surface 110 on the gland segment, and the stator segment is axially retained due to the axial interference created between the segment of the elastomeric seal 86 ring and the radially projecting shoulder 93 of the stator segment. Thus, each gland segment can have its respective stator, seal ring and pushing ring segments mounted thereon at the factory so as to provide a unitized subassembly, thereby facilitating shipping, handling and subsequent assembly of these stator subassemblies to the shaft.

To permit the two stator subassemblies to be fixedly secured to one another for assembly around the shaft 12, the flat end surfaces 118 of each gland segment each have a pair of openings 119 formed inwardly therefrom, with the openings 119 and gland surface end surface being aligned with the corresponding openings in the opposed glands segment and surface. Most conveniently, the openings 119 in one gland segment are smooth bores, and the openings 119 in the other gland segments are threaded so that threaded fasteners formed as cap screws 120 can be slideably inserted through the two openings at opposite ends of one gland segment and threadably engaged with the threaded openings formed in opposite ends of the opposed gland segments so as to fixedly clamp the two gland segments together and thus form a rigid annular structure.

The opposed gland segments are also preferably provided with alignment pins 122 cooperating with aligned openings 121 associated with opposed ends of the gland segments. These pins are similar to the alignment pins associated with the collar segments in that one end of each pin preferably fixedly secured to its respective gland segment, as by a press fit, and projects outwardly from the end surface so as to be inserted into an opening which opens inwardly from the opposed end surface of the other gland segment. A single such alignment pin provided for cooperation between each opposed pair of end surfaces greatly facilitates the alignment of the two stator subassemblies so that they can be slideably moved together for fixed securement by the cap screws 120 while insuring that proper concentric alignment between the semicylindrical segments is achieved.

One of the opposed end surfaces 118 at each end of the two gland segments is also preferably provided with a flat thin gasket 123 associated therewith and extending along the end surface adjacent the inner annular wall thereof, substantially as illustrated in FIG. 2, to thus create an effective seal between the opposed gland member segments when they are clamped together, and thereby peripherally sealingly enclosing the annular chamber 124 which surrounds the seal rings.

Further, the inner end wall of the gland is adapted to substantially abutting contact the end face of the housing part, and an annular flat gasket 125 is typically provided at the interface between these walls to create a seal. To improve on the performance of this gasket and to prevent pressure blowout or extrusion thereof, the end wall of the gland where it engages the gasket 125 is preferably provided with shallow notches or grooves therein, such as by creating a shallow spiral groove or a plurality of shallow grooves of different diameter. Thus, the compression of the gasket 125 between the opposed walls on the housing and gland thus cause the gasket material to deform or flow into the grooves to create a mechanical lock, and thus provide increased resistance against pressure blowout of the gasket.

To secure the stator assembly to the housing, the gland has a plurality of openings or slots extending axially there through, which openings accommodate conventional fasteners such as cap screws 126 which extend through the openings and engage within threaded openings (not shown) formed in the end face of the housing.

Figure 8:
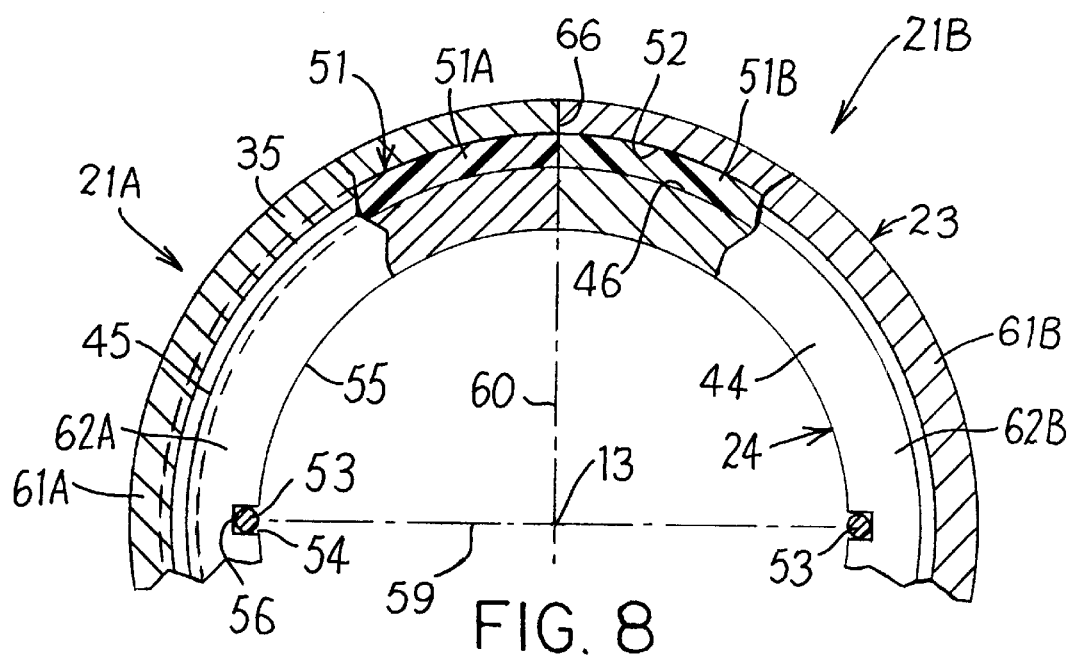
FIG. 8 is an enlarged fragmentary sectional view taken along line 8—8 in FIG. 2.
Figure 9:
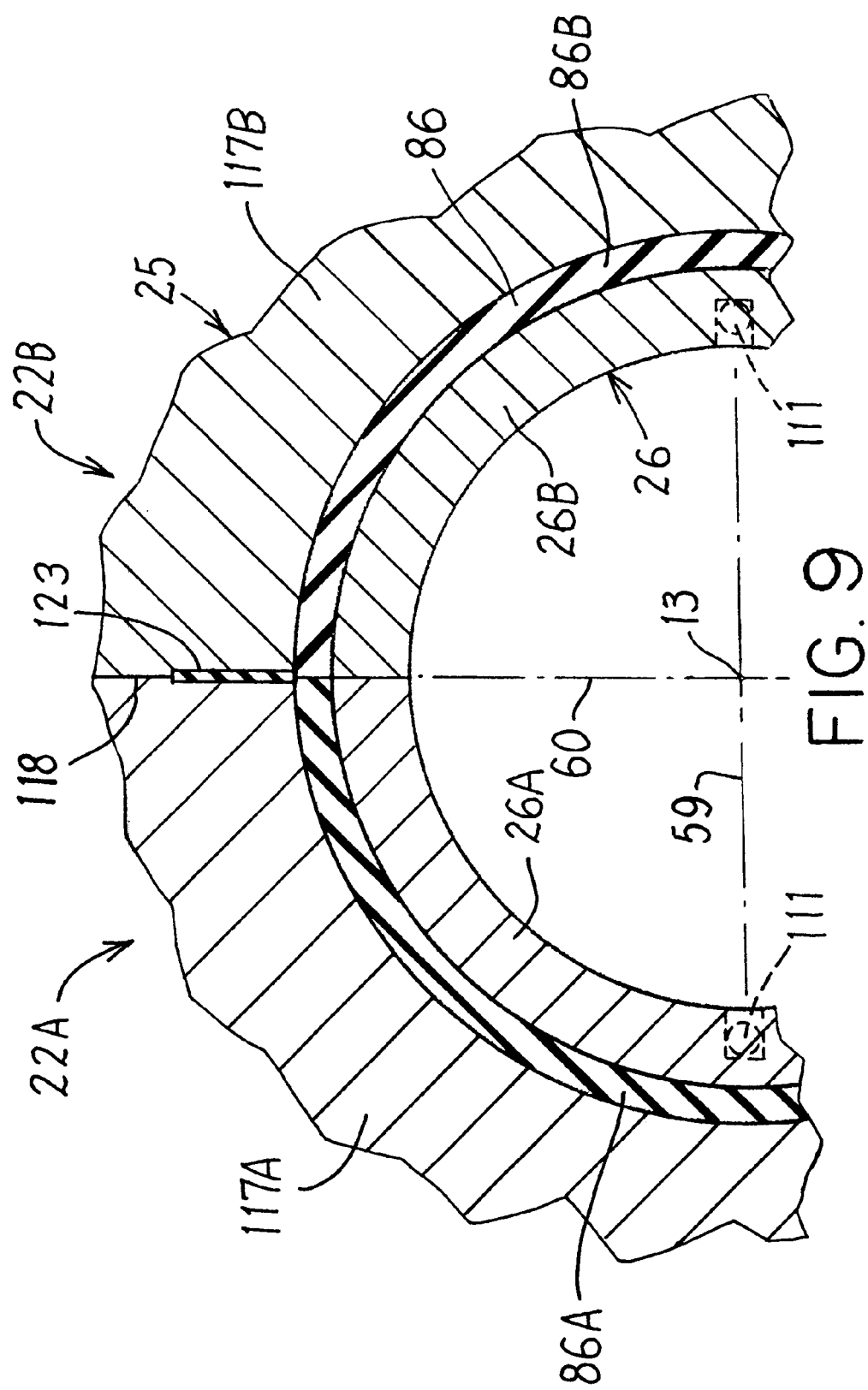
FIG. 9 is an enlarged fragmentary sectional view taken along line 9—9 in FIG. 2.
Figure 11:
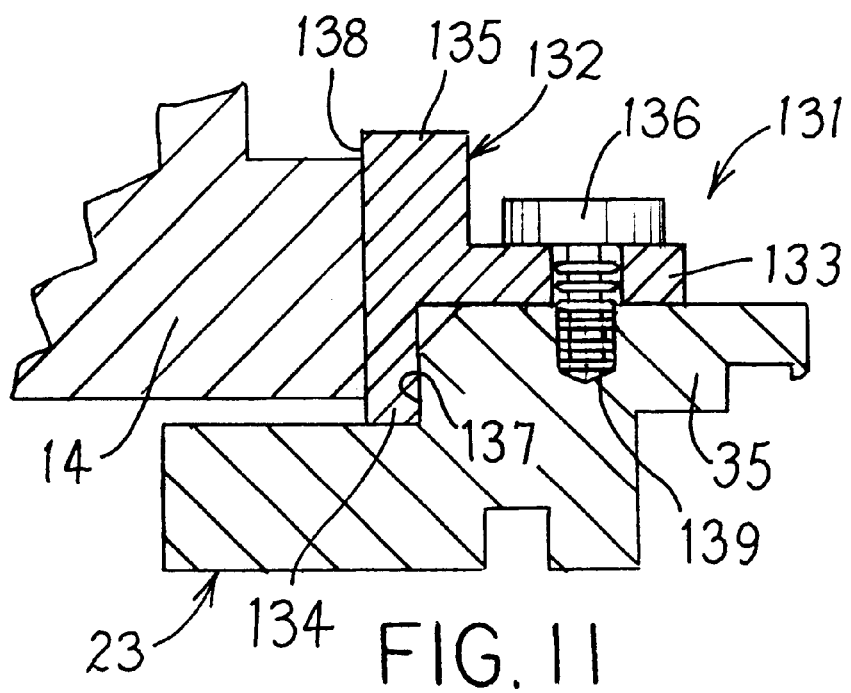
FIG. 11 is a fragmentary sectional view taken along line 11—11 in FIG. 10.
Figure 10:
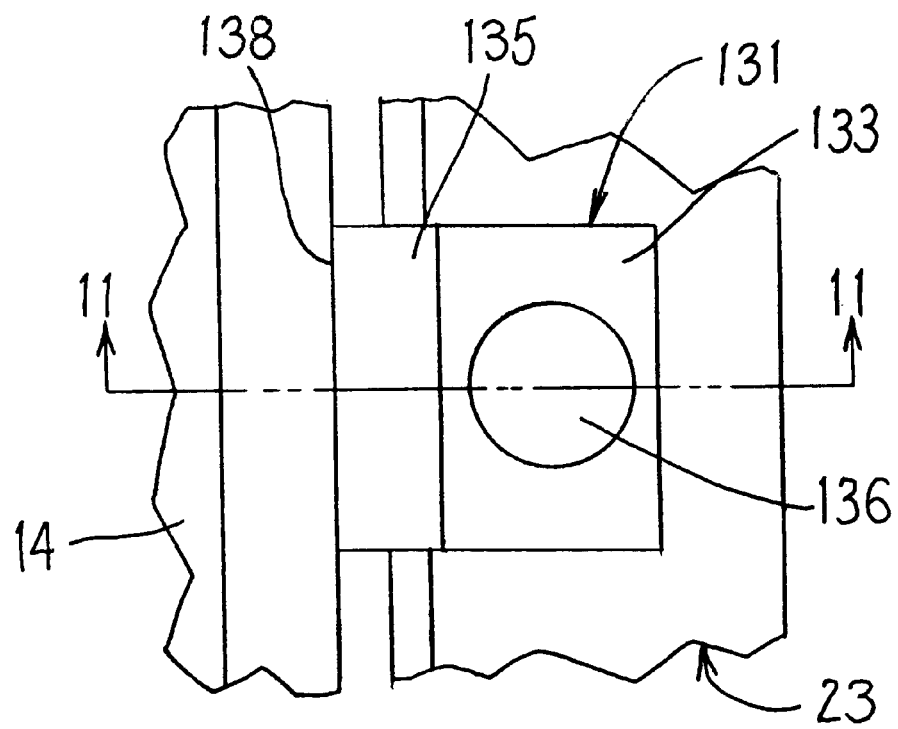
FIG. 10 is a fragmentary top view illustrating a clip which mounts on the rotor assembly to facilitate proper positioning during installation thereof.

To facilitate positioning of the rotor assembly on the shaft at the job site, each preassembled rotor subassembly 21A and 21B has a positioning clip assembly 131 (FIGS. 8 and 9) provided thereon which includes a generally T-shaped clip member 132 provided with a base leg 133 which overlies the outer annular wall of the front sleeve part 35 of the collar segment. This base leg joins to an inner leg 134 which projects radially inwardly so as to overlap and effectively abut against the axial end face 137 defined between the front and rear sleeve parts of the collar segment. A further leg 135 projects outwardly from the base leg 133 in generally perpendicular relationship therewith, and the inner and outer legs 134–135 have a common end face 138 which extends generally perpendicular to the axis of the rotor assembly and which, during assembly of the rotor assembly on the shaft, is disposed so as to abuttingly engage the end face of the stuffing box housing 14 to permit proper positioning of the rotor assembly relative to the stuffing box housing.

Each rotor segment is preferably provided with at least one such positioning clip 131 thereon, preferably substantially at the middle of the semi-cylindrical configuration of the subassembly. The clip member 132 is secured to the collar segment by means of a plastic fastener 136, the shank of which projects through an opening in the base leg 133 into a blind bore 139 which opens radially inwardly from the outer annular wall of the front sleeve part of the collar. The shank of the fastener has deformable flanges thereon for gripping the bore, such fastener being conventional and similar to the type which is often referred to as a Christmas tree fastener.

The assembly of the rotor and gland subassemblies, and the joining together of the pairs of rotor and gland subassemblies to form annular rotor and gland assemblies, to facilitate shipping and handling has been explained above. The job-site assembly of the split mechanical seal assembly 20 onto the shaft 12 of a fluid handling device 10 will now be briefly described.

The rotor assembly 21 is first assembled onto the shaft 12. The cap screws 69 are removed so as to permit separation of the rotor subassemblies 21A and 21B. These subassemblies are then positioned on diametrically opposite sides of the shaft 12 so that the pair of alignment pins which are effectively disposed on diametrically opposite sides of the shaft are aligned with the opposed smooth bores formed in the ends of the opposed collar segment, with the pins and bores being interfitted and the opposed rotor segments being slideably moved toward one another until the end faces abut. The engagement of the inner diameter of the collar member on the shaft, and specifically the engagement of the elastomeric seal ring 34 carried thereby, insures that the rotor assembly is properly centered on the shaft. The caps screws 69 are again reinserted through the smooth bores 67 and engaged with the opposed threaded bores 68 so as to tighten the opposed rotor segments together to insure a tight fitting engagement between the opposed ends of the collar and rotor segments, respectively. After the cap screws 69 have been tightened, the final positioning of the rotor assembly relative to the shaft and housing is carried out. In this respect, the rotor is positioned on the shaft such that the end faces 138 of the positioning clips 131 are disposed in abutting engagement with the end face of the stuffing box housing. The set screws 72 are then tightened downwardly against the shaft to insure that the diametrically opposed side of the rotor assembly is drawn into snug engagement with the shaft. If the other pair of set screws 74 is provided, then they are also tightened into snug engagement with the shaft. After all of the set screws have been tightened, the installer then removes the positioning clips 131. This can be accomplished by slipping the flat blade of a screwdriver under the base leg 133 and prying upwardly, which typically effects removal of the plastic fastener 136 so that the entire clip can be readily removed and disposed of. The stator assembly 22 is now ready to be mounted on the shaft. To do so, the cap screws 120 are removed so as to effect separation of the semi-cylindrical gland segments, which are then positioned on diametrically opposite sides and are disposed so that the alignment pins 122, which diametrically straddle the shaft, are aligned with the opposed bores and the gland subassemblies are slideably engaged on the alignment pins and slideably moved into a position whereby the opposed end surfaces 118 of the gland segments substantially abut. In this latter position the cap screws 120 are inserted into the appropriate openings so as to threadably connect the gland segments effect a proper tight fit there-between, whereby the gaskets 123 positioned between the end surfaces create a seal between the gland segments. The stator assembly as secured together in position around the shaft is then moved axially toward the rotor assembly so that the seal face 28 on the stator abuts the opposed seal face 27 on the rotor and causes the stator 26 to move axially outwardly (rearwardly) relative to the gland so as to effect outward movement of the pusher ring and partial compression of the springs. The gland is moved forwardly toward the rotor until the end face of the gland, and specifically the annular gasket 125 position thereon, abuts the end face of the stuffing box housing. When so disposed, then the securing cap screws are inserted axially through the appropriate gland openings and threaded into the stuffing box housing so as to effect a secure fixed connection of the gland thereto.

To assist in positioning of the gland assembly on the shaft, each gland segment is preferably provided with two or more plastic centering tabs (not shown) mounted on the outer end face thereof and projecting radially inwardly to a location corresponding to the shaft diameter so as to concentrically position the stator assembly relative to the shaft, which centering tabs are removed after the stator assembly has been firmly attached to the housing. The use of such centering tabs on a gland is conventional.

Briefly summarizing the improved face seal assembly of this invention, this assembly utilizes a pair of drive pins cooperating with both the stator and rotor face rings, with at least one said drive pin being disposed for cooperation with each rotor and stator face ring segment. These drive pins not only prevent the face rings from rotating or spinning relative to the respective collar and gland during operation, but they also radially retain the face ring segments relative to the respective collar and gland segments during shipping and installation. In addition, each of the face rings segments has a step or shoulder which effectively catches against the respective O-ring segment, which O-rings 51 and 86 are preferably square or rectangular in cross-section so as to perform this function. This latter relationship thus retains the respective face ring in the axial direction relative to its supporting collar or gland, while at the same time the respective drive pin is positioned to retain the face ring in the radial direction. The combination of the drive pin and the rectangular O-ring and their cooperation between each face segment and the respective collar or gland segment thus effectively retains the two halves (i.e., subassemblies) of each of the rotor and stator assembly as a preassembled unit to facilitate handling and installation thereof, and thereby eliminating the need to separately handle and separately install the individual parts, particularly the face ring parts or segments. Since handling of the face ring parts or segments greatly increases the risk of physical damage and/or contamination from dirt, these disadvantages are hence effectively eliminated or greatly minimized.

In addition, the improved assembly also has the spring pusher or retainer captured in a manner similar to that used for capturing the seal faces. That is, the spring retainer or pusher is also diametrically split but has an annular shoulder on the outside diameter thereof which is accommodated in a surrounding annular groove defined by the gland shroud, which arrangement thus prevents the spring retainer or pusher member from sliding axially out of the gland. Further, the pins associated with the spring retainer pass through axial holes in the gland shroud, and this prevents the spring retainer from falling out of the gland in the radial direction during handling and installation. This arrangement thus eliminates the need for retaining clips, shoulder screws or buttons which are typically used to capture the spring retainer. This arrangement also insures that the spring retainer halves are located in the same axial plane when the gland halves are assembled so as to insure that the stator face ring halves, which are preassembled in the gland, are properly aligned when the gland halves are assembled around the shaft.

While the description and illustration described above involves mounting of the mechanical seal assembly directly on the shaft, it will be appreciated that in most fluid handling devices the mechanical seal assembly is mounted on a shaft sleeve which in turn directly surrounds and is nonrotatably secured to the shaft. Thus, any reference herein to the shaft 12 is intended to encompass the situation where the shaft may be provided with a separate sleeve member nonrotatably secured in surrounding relationship thereto, with the mechanical seal assembly being mounted directly on the shaft sleeve.

During operation, the pressurized pumping fluid is present in the stuffing box 15 and hence is also present within the annular chamber 124 defined by the gland, which chamber 124 surrounds the major components of the seal assembly, namely the collar, the stator and the rotor. The pressurized fluid is prevented from escaping to the surrounding environment due to the elastomeric seal rings 34, 51 and 86, and due to the mechanical face seal provided between the relatively rotating but snuggly engaged flat seal surfaces 27 and 28. The pressurized pumping fluid thus surrounds the outer periphery or outer diameter of the engaged seal faces 27–28, whereas the lower pressure atmosphere exists adjacent the inner diameter of the engaged seal faces 27–28. The cooperation of the seal faces and the sealing function which they provide is generally conventional and well understood.

Further, in the improved seal assembly of the present invention, the pressurized pump fluid in the chamber 124 acts on the rear surface of the rotor radially outwardly from the diameter of the annular surface 46. The pressure fluid also acts on rear surface of the stator radially outwardly from the diameter from the annular surface 92. The intermediate surface 92, however, has a larger diameter than the intermediate annular surface 46 of the rotor. The pressure fluid in the chamber 124 thus exerts a greater pressure force on the rotor urging it axially outwardly (rightwardly in FIG. 2) than the fluid pressure force which acts on the stator urging it axially inwardly (leftwardly in FIG. 2), although the difference in these forces is never large enough to overcome the leftward urging of the spring force created by the pressure device. However, even as the pressure level of the working fluid in the chamber 124 increases, and hence creates a larger outwardly (i.e. rightwardly) oriented unbalanced pressure force on the rotor, this force is still overcome by the spring force, but nevertheless tends to decrease or minimize the contact force between the abutting contact surfaces 39 and 44. However, since the contact pressure between the surfaces 39 and 44 is reduced during operation due to the unbalanced hydraulic pressure force imposed on the rotor, this thus minimizes any undesirably effects which result from irregularities with respect to the flatness of the contact surface 39, and thus minimizes any undesired twisting or distortion of the rotor since the contact stresses at the contacting faces 39 and 44 are not only minimized but progressively reduced as the working pressure of the fluid increases, and thus this seating relationship at surfaces 39–44 becomes less critical to the overall performance of the seal.

Although a particular preferred embodiment of the invention has been disclosed in detail for illustrative purposes, it will be recognized that variations or modifications of the disclosed apparatus, including the rearrangement of parts, lie within the scope of the present invitation.

What is claimed is:

1. A mechanical seal assembly for creating a sealed engagement between an annular stuffing box housing and a shaft which projects concentrically out of the stuffing box housing and is rotatable about its longitudinal axis, said mechanical seal assembly comprising:

a rotor assembly which includes an annular collar which is mountable in sealed and nonrotatable engagement with the shaft in concentric surrounding relationship therewith, a first annular face ring which is sealingly and concentrically mounted within said collar and has an axially exposed end which defines thereon an axially facing first annular seal face, a first annular elastomeric seal ring disposed radially between and sealingly engaged with an inner annular wall on said collar and an outer annular wall on said face ring, and a drive pin connected between said collar and said face ring for nonrotatably coupling the collar and face ring together;

an annular stator assembly nonrotatably mountable on the stuffing box housing in generally concentric and surrounding relationship to the shaft and including an annular gland member which sealingly engages and nonrotatably mounts to the stuffing box housing, a second face ring which is mounted generally concentrically within said gland member and is axially slideable relative thereto, said second face ring defining a second generally flat annular seal face on an inner axial end thereof so that said second seal face is disposed in axially opposed relation to said first annular seal face, a second elastomeric seal ring disposed radially between and sealingly engaged with a surrounding inner annular surface on said gland member and a surrounding exterior annular surface on said second face ring, and a pushing device nonrotatably carried on said annular gland member and cooperating with said second face ring for urging same axially inwardly so as to maintain said first and second seal faces in opposed abutting contact with one another when the mechanical seal assembly is assembled on the shaft;

said rotor assembly being split axially along a substantially diametral plane into two substantially semi-cylindrical rotor subassemblies with said split as it extends along said diametral plane splitting each of said collar, said first elastomeric seal ring and said first face ring into substantially semicircular segments with said collar and said first face ring having substantially flat end surfaces at said splitting plane;

each said rotor subassembly having radial shoulders formed on the respective collar and first face ring segments which axially overlap with opposite axial sides of said first elastomeric seal ring segment to prevent the first face ring segment from being axially withdrawn from the respective collar segment, and a said drive pin being fixed to each said collar segment and projecting axially therefrom into a recess formed in the respective first face ring segment with said recess being bounded by a radially outer wall which is disposed closely adjacent an opposed side of the respective pin so as to restrain the first face ring segment from moving radially inwardly relative to the respective collar segment, whereby the respective segments of the collar, first face ring and first elastomeric seal ring of each rotor subassembly are preassembled to define a unitized subassembly to facilitate shipping and handling prior to mounting thereof on the shaft.

2. A mechanical seal construction according to claim 1, wherein the stator assembly is also diametrical axially split to define two substantially semi-cylindrical stator subassemblies with said splitting along said diametrical plane causing each of the gland member, second face ring and second elastomeric seal ring to be split into substantially semicircular segments with said gland member and second face ring segments having generally flat ends at the splitting plane.

3. A mechanical seal construction according to claim 1, wherein the collar segments at each end thereof have aligned openings which extend therethrough in generally intersecting relationship to the opposed end surfaces, the center lines of said openings defining a securing plane which extends generally perpendicular to the axis of the shaft, and a pair of removable threaded fasteners each being positionable in the aligned openings at one end of the collar segments for fixedly securing the collar segments together in a substantially endless annular configuration, and each of said collar segments also having a threaded opening extending radially there through and having a set screw provided therein for engaging a surface of the shaft to fix the collar thereto, said set screw opening having the axis thereof disposed generally within said securing plane.

4. A mechanical seal assembly according to claim 3, wherein two said set screw openings are disposed circumferentially closely adjacent and circumferentially on opposite sides of one of said threaded fasteners so that the pair of said set screws are disposed adjacent one diametral side of the collar, the opposite diametral side of the collar being free of set screws.

5. A mechanical seal construction according to claim 1, wherein said first elastomeric seal member where it engages the outer annular wall of said first face ring has a first diameter, wherein said second elastomeric seal member where it engages an outer annular wall of said second face ring has a second diameter which is greater than said first diameter, and wherein the first face ring has a nose part spaced axially forwardly of said first elastomeric seal member and which projects radially outwardly beyond said first diameter and defines said first seal face thereon, whereby presence of pressurized process fluid in an annular chamber defined by said gland member in surrounding relationship to the engaged first and second seal faces creates an unbalanced hydraulic force on said first face ring which is oriented axially outwardly in a direction toward said second face ring to partially relieve the contact pressure between said first face ring and said collar.

6. A mechanical face seal assembly for creating a seal between a stuffing box housing and a shaft which projects outwardly of the stuffing box housing and is rotatable relative thereto about its longitudinal axis, said face seal assembly comprising:

a rotor assembly mountable on the shaft in sealed and nonrotatable relationship therewith including a sleeve-type collar which is nonrotatably and sealingly mountable on the shaft and a first face ring which is mounted on and carried by the collar, said first face ring defining a first annular sealing face thereon which is disposed on an axially outwardly facing end surface of said first face ring;

a stator assembly disposed in surrounding relationship to the shaft and nonrotatably mountable to the stuffing box housing, the stator assembly including an annular gland member which surrounds the shaft and is nonrotatably mountable on the stuffing box housing, and a second face ring which is nonrotatably carried on the gland housing in surrounding relationship to the shaft and defines a second annular sealing face on an axially outwardly facing end surface thereof so that said first and second sealing faces are disposed in axially opposed relationship to one another;

one of said stator and rotor assemblies having a pushing device cooperating with the face ring of said one assembly for urging the face ring of said one assembly axially toward the face ring of the other assembly so as to normally maintain the opposed first and second sealing faces in abutting contact with one another;

said rotor assembly including a substantially annular bore which opens axially inwardly from one end of said collar and terminates in a substantially flat bottom wall which extends transversely with respect to a longitudinal axis of the collar, said first face ring having an axially extending rear annular part which terminates at a substantially rear flat end face which extends substantially perpendicularly relative to a longitudinal axis of the first face ring, said rear annular part being disposed within the annular bore of the collar so that the rear flat end face of the first face ring abuts the bottom wall on the collar, a first annular elastomeric seal member disposed within the annular bore of the collar and in circling relationship to said rear annular part of said first face ring, said first elastomeric seal member being maintained in sealing engagement with both said collar and said first face ring, said first elastomeric sealing member being axially abutted against a shoulder on the collar which prevents the first face ring from moving axially outwardly of the annular bore, said first elastomeric seal member also being axially abutted against a shoulder on the rear annular part when the first face ring is seated against said bottom surface so as to retain the first face ring axially within the annular bore;

said rotor assembly also including a drive pin arrangement cooperating between said collar and said first face ring for preventing relative rotation there between, said drive pin arrangement including at least two drive pins fixed to said collar in angularly spaced relationship from one another and projecting axially therefrom into respective recesses which open axially inwardly of said first face ring, each said recess having a radially outer wall which is disposed in close proximity to an opposed side surface of the respective drive pin so as to restrain said first face ring from radially inward movement relative to the respective drive pin;

said rotor assembly being axially split in its entirety into two substantially similar rotor subassemblies each having a substantially semi-cylindrical configuration with the axial splitting of said rotor assemblies causing each of the collar, first face ring and first elastomeric seal member to be axially split into two substantially semi-cylindrical segments, one of said drive pins being associated with each of said rotor subassemblies with said drive pin being angularly spaced from opposite arcuate ends of the respective rotor subassembly so that the respective drive pin radially retains the face ring segment within the respective collar segment while the elastomeric member segment axially retains the face ring segment within the respective collar segment, whereby the rotor subassemblies can be preassembled and handled as a unitized arrangement and;

removable fastening means cooperating between opposed ends of the collar segments for permitting the opposed collar segments to be fixedly secured in an annular configuration in surrounding relationship to said shaft.

7. A mechanical seal assembly according to claim 6, wherein said rotor assembly is axially split along a diametral plane.

8. A mechanical seal assembly according to claim 7, wherein the removable fastener for joining the rotor subassemblies together comprises two threaded fasteners which cooperate with openings formed in opposed ends of the collar segment on diametrically sides of the shaft for fixedly securing the collar segments together in an annular configuration in surrounding relationship to the shaft, said two threaded fasteners being disposed within a securing plane which extends generally perpendicularly with respect to the axis of the shaft, and a pair of set screws threadably supported on the collar for engaging the shaft to fix the collar to the shaft, each collar segment having a said threaded opening extending radially therethrough and having one of said set screws threadably engaged therein, said set screws being disposed substantially within said securing plane.

9. A mechanical seal assembly according to claim 8, wherein said pair of set screws are disposed adjacent one diametral side of the collar so that the set screws are disposed closely adjacent and on circumferentially opposite side of one of said fasteners so that the reaction force from the set screws onto the collar has minimal effect with respect to its tendency to separate the collar segments.

10. A mechanical seal assembly according to claim 6, wherein said pushing device is associated with and nonrotatably coupled to said gland member and includes an annular pusher ring which has an end face normally maintained in pushing abutting contact with an outer axial end face of said second face ring, and a plurality of springs cooperating between said gland member and said pusher ring and urging said second face ring axially toward said first face ring;

said stator assembly including a second annular elastomeric seal member sealingly cooperating radially between an inner annular surface of said gland member and an outer annular surface of said second face ring;

said stator assembly including a pin arrangement coacting between said pusher ring and said second face ring for preventing relative rotation there-between, said pin arrangement including at least two pins fixed to said pusher ring in angularly spaced relationship and projecting axially from said pusher ring into respective recesses formed in said second face ring, each of said recesses having a radially outer wall which is disposed closely adjacent an opposed side surface of the respective pin for restraining inward radial movement of the second face ring relative to the respective pin; and said stator assembly being axially split into two similar stator subassemblies which each have a substantially semi-cylindrical configuration, said split causing each of said gland member, said second face ring, said second elastomeric seal member and said pusher ring to be split into two substantially semi-cylindrical segments, each segment of said pusher ring having one of said pins secured thereto and projecting axially into a said recess associated with the respective segment of the second sealing ring, the pins and recesses being spaced peripherally a substantially distance from split ends of the respective segments, and said gland member and said second face ring having shoulders thereon which abut opposite axial sides of said second elastomeric seal member for preventing axial separation of the second face ring segment from the respective gland member segment, whereby the stator subassemblies can be individually preassembled with the respective second face ring segment being both axially and radially retained on the respective gland member segment.

11. Mechanical seal assembly according to claim 9, wherein each said pusher ring segment has a said pin fixed thereto substantially midway between the ends of thereof, wherein each segment of said first face ring has a said recess formed therein substantially midway between the ends of the segment for accommodating the respective pin therein, said recess opening axially inwardly from an outer axial end face of the respective face ring segment and opening radially outwardly from the inner diameter thereof.

12. A mechanical seal construction according to claim 11, wherein the gland member segment has an arcuate shroud segment which externally surrounds the pusher ring segment and includes an outer wall which surrounds and axially slideably supports the pusher ring segment and a radial wall which is disposed axially outwardly of said pusher ring segment, said springs being axially confined between said radial wall and said pusher ring segment for urging said pusher ring segment axially inwardly towards said first face ring segment, said pusher ring segment also having a projection thereon which couples to said shroud for preventing relative rotation there-between.

13. A mechanical seal construction according to claim 12, wherein said pusher ring and said gland member have axially opposed stop surfaces which restrict the spring-urged axial inward movement of the pusher ring.

14. A mechanical seal construction according to claim 11, wherein said first elastomeric seal member where it engages the outer annular wall of said first face ring has a first diameter, wherein said second elastomeric seal member where it engages an outer annular wall of said second face ring as a second diameter which is greater than said first diameter, and wherein the first face ring has a nose part spaced axially forwardly of said first elastomeric seal member and which projects radially outwardly beyond said first diameter and defines said first seal member face thereon, whereby presence of pressurized process fluid in an annular chamber defined by said gland member in surrounding relationship to the engaged first and second seal faces creates an unbalanced hydraulic force on said first face ring which is oriented axially outwardly in a direction toward said second face ring to partially relieve axial contact pressure between said first face ring and said collar.

15. A mechanical seal assembly for creating a sealed engagement between an annular stuffing box housing and a shaft which projects concentrically out of the stuffing box housing and is rotatable about its longitudinal axis, said mechanical seal assembly comprising:

a rotor assembly which includes an annular collar which is mountable in sealed and nonrotatable engagement with the shaft in concentric surrounding relationship therewith, a first annular face ring which is sealingly and concentrically mounted within said collar and has an axially exposed end which defines thereon an axially facing first annular seal face, and a first annular elastomeric seal ring disposed between and sealingly engaged with annular walls on said collar and said face ring;

an annular stator assembly nonrotatably mountable on the stuffing box housing in generally concentric and surrounding relationship to the shaft and including an annular gland member which sealingly engages and nonrotatably mounts to the stuffing box housing, a second annular face ring which is mounted generally concentrically within said gland member, said second face ring defining a second generally flat annular seal face on an inner axial end thereof so that said second seal face is disposed in axially opposed relation to said first annular seal face, and a second elastomeric seal ring disposed between and sealingly engaged with annular surfaces on said gland member and said second face ring;

said rotor assembly being split axially along a substantially diametral plane into two substantially semi-cylindrical rotor subassemblies with said split as it extends along said diametral plane splitting each of said collar, said first elastomeric seal ring and said first face ring into substantially semicircular segments;

each said rotor subassembly having adjacent and opposed stop surfaces defined on the segments of said collar and said first face ring and an axially protruding drive pin for drivingly coupling each segment of the first face ring to the respective segment of the collar to both axially and radially restrain said first face ring segment relative to the respective collar segment to prevent separation therebetween, whereby the respective segments of the collar, first face ring and first elastomeric seal ring of each rotor subassembly are preassembled to define a unitized subassembly prior to mounting thereof on the shaft;

said stator assembly being axially split along a substantially diametral plane into two substantially semi-cylindrical stator subassemblies with said split along said diametrical plane splitting each of the gland member, said second face ring and said second elastomeric seal ring into substantially semicircular segments; and each said stator subassembly having adjacent and opposed stop surfaces cooperating between said gland member and said second face ring segments to both axially and radially restrain said second face ring segment relative to said respective gland member segment to prevent separation therebetween, whereby the respective segments of the gland member, second face ring and second elastomeric seal ring of each stator subassembly can be preassembled to define a unitized subassembly prior to mounting thereof on the shaft.

16. A mechanical seal assembly according to claim 15, including two threaded fasteners which cooperate with openings formed in opposed ends of the collar segments on diametrically opposite sides of the shaft for fixedly securing the collar segments together in an annular configuration in surrounding relationship to the shaft, said two threaded fasteners being disposed within a securing plane which extends generally perpendicularly with respect to the axis of the shaft, and a pair of set screws threadably supported on the collar for engaging the shaft to fix the collar to the shaft, each collar segment having a said threaded opening extending radially therethrough and having one of said set screws threadably engaged therein, said set screws being disposed substantially within said securing plane.

17. A mechanical seal assembly according to claim 16, wherein said pair of set screws are disposed adjacent one diametral side of the collar so that the set screws are disposed closely adjacent and on circumferentially opposite side of one of said fasteners so that the reaction force from the set screws onto the collar has minimal effect with respect to its tendency to separate the collar segments.

18. A mechanical seal assembly according to claim 15, wherein a pushing device is associated with and nonrotatably coupled to said gland member and includes an annular pusher ring which has an end face normally maintained in pushing abutting contact with an outer axial end face of said second face ring, and a plurality of springs cooperating between said gland member and said pusher ring and urging said second face ring axially toward said first face ring, said pusher device including said pusher ring being axially split along said diametral plane into substantially semicircular segments with each said segment being retained by the respective stator subassembly.

19. A mechanical seal assembly for creating a sealed engagement between a stuffing box housing and a shaft which projects out of the stuffing box housing and is rotatable about its longitudinal axis, said mechanical seal assembly comprising:

a rotor assembly which includes an annular collar which is mountable in sealed and nonrotatable engagement with the shaft in concentric surrounding relationship therewith, a first annular face ring which is sealingly and conentrically mounted within said collar and which defines thereon an axially facing first annular seal face, and a first annular elastomeric seal ring disposed between and sealingly engaged with annular walls on said collar and said face ring;

an annular stator assembly nonrotatably mountable on the stuffing box housing in surrounding relationship to the shaft and including an annular gland member which sealingly engages and nonrotatably mounts to the stuffing box housing, a second annular face ring which is mounted generally concentrically within said gland member, said second face ring defining thereon an axially facing second annular seal face disposed in axially opposed relation to said first annular seal face, and a second elastomeric seal ring disposed between and sealingly engaged with annular sufaces on said gland member and said second face ring;

said rotor assembly being split axially into only two rotor subassemblies with said split splitting each of said collar, said first elastomeric seal ring and said first face ring into arcuate segments;

each said rotor subassembly being configured to axially and radially retain said first face ring segment relative to the respective collar segment with the respective elastomeric seal ring segment retained therebetween, the respective segments of the collar, first face ring and first elastomeric seal ring of each rotor subassembly being preassembled to define a unitized subassembly prior to mounting thereof on the shaft;

said stator assembly being split axially into only two stator subassemblies with said split splitting each of said gland member, said second face ring and said second elastomeric seal ring into substantially arcuate segments;

each said stator subassembly being configured to axially and radially retain said second face ring segment relative to said respective gland member segment with the respective elastomeric seal ring segment retained therebetween, the respective segments of the gland member, second face ring and second elastomeric seal ring of each stator subassembly being preassembled to define a unitized subassembly prior to mounting thereof on the shaft;

said rotor and stator subassemblies being separate and independent unitized subassemblies; and the collar segments at each end thereof having aligned openings which extend therethrough in generally intersecting relationship to opposed end surfaces of the collar segments, the centerlines of said openings defining a securing plane which extends generally perpendicular to the axis of the shaft, and a pair of removable threaded fasteners each being positioned in the aligned openings at one end of the collar segments for fixedly securing the collar segments together in a substantially endless annular configuration, and each of said collar segments also having a threaded opening extending radially therethrough and having a set screw provided therein for engaging a surface of the shaft to fix the collar thereto, said set screw opening having the axis thereof disposed generally within said securing plane.

20. A mechanical seal assembly according to claim 19, wherein the elastic seal ring segment associated with each said subassembly is axially retained between a pair of opposed shoulders formed on the respective rotor and stator segment and is also axially retained between a pair of opposed shoulders formed on the respective collar and gland member segment.

21. A mechanical seal assembly according to claim 19, wherein each said subassembly has an axial protrusion engaged within an opposed recess to radially retain the rotor and stator segment on the respective collar and gland member segment.

22. A mechanical seal assembly for creating a sealed engagement between a stuffing box housing and a shaft which projects out of the stuffing box housing and is rotatable about its longitudinal axis, said mechanical seal assembly comprising:

a rotor assembly which includes an annular collar which is mountable in sealed and nonrotatable engagement with the shaft in concentric surrounding relationship therewith, a first annular face ring which is sealingly and concentrically mounted within said collar and which defines thereon an axially facing first annular seal face, a first annular elastomeric seal ring disposed between and sealingly engaged with annular walls on said collar and said face ring;

an annular stator assembly nonrotatably mountable on the stuffing box housing in surrounding relationship to the shaft and including an annular gland member which sealingly engages and nonrotatably mounts to the stuffing box housing, a second annular face ring which is mounted generally concentrically within said gland member, said second face ring defining an axially facing second annular seal face disposed in axially opposed relation to said first annular seal face, and a second elastomeric seal ring disposed between and sealingly engaged with annular sufaces on said gland member and said second face ring;

said first face ring having an axially facing rear surface which is directly and substantially rigidly seated against an opposed support surface on said collr;

said first face ring having a second axially facing rear surface which is separated from said first rear surface by said first seal ring and which is exposed to fluid in the stuffing box in surrounding relation to the seal assembly for exerting a fluid-created unbalanced force on the first face ring in a direction away from said support surface;

said rotor assembly being split axially along a plane into two rotor subassemblies with said split splitting each of said collar, said first elastomeric seal ring and said first face ring into substantially arcuate segments; and each said rotor subassembly having adjacent and opposed stop surfaces defined on the segments of said collar and said first face ring to axially and radially retain said first face ring segment relative to the respective collar segment to prevent separation therebetween, the respective segments of the collar, first face ring and first elastomeric seal ring of each rotor subassembly being preassembled to define a unitized subassembly prior to mounting thereof on the shaft.

23. A seal assembly according to claim 22, where a pair of spaced and axially opposed said stop surfaces are defined on each of said collar and first face ring segments and the first elastomeric seal ring segment is positioned axially between the pair of axially opposed stop surfaces formed on each of the collar and face ring segments.

24. A seal assembly according to claim 1 wherein:

said stator assembly is split axially into two stator subassemblies with said split splitting each of the gland member, said second face ring and said second elastomeric seal ring into substantially arcuate segments;

each said rotor and stator subassembly being a separate and independent subassembly; and each said stator assembly having adjacent and opposed stop surfaces defined on said gland member and said second face ring segments to axially and radially retain said second face ring segment relative to said respective gland member segment to prevent separation therebetween, the respective segments of the gland member, second face ring and second elastomeric seal ring of each stator subassembly being preassembled to define a unitized subassembly prior to mounting thereof on the shaft.

* * * * *

UNITED STATES PATENT AND TRADEMARK OFFICE
CERTIFICATE OF CORRECTION

PATENT NO.    : 6,485,023 B2
DATED         : November 26, 2002
INVENTOR(S)   : James Budrow et al.

It is certified that error appears in the above-identified patent and that said Letters Patent is hereby corrected as shown below:

Column 22,
Line 4, after "claim 1" insert -- , --.
Line 12, change "stator assembly" to -- stator subassembly --.

Signed and Sealed this

Eighteenth Day of March, 2003

JAMES E. ROGAN
*Director of the United States Patent and Trademark Office*